June 25, 1957  L. A. BETZ  2,796,880
MEASURING SIPHON
Filed April 8, 1954
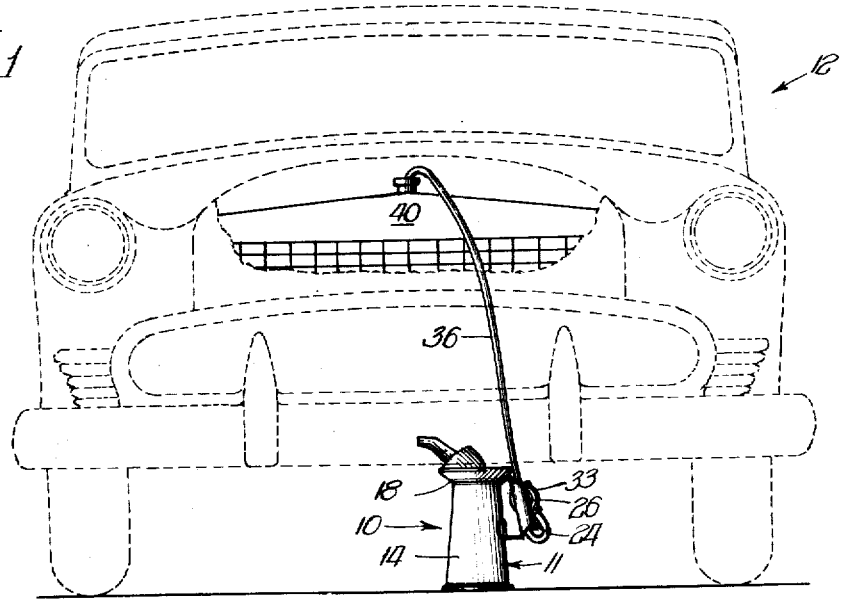
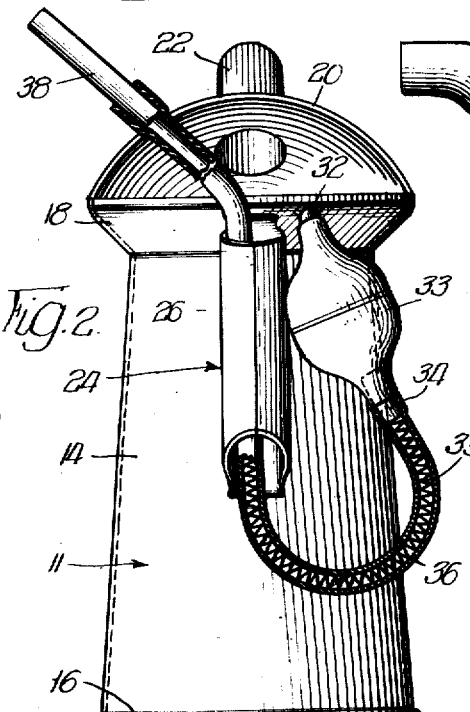
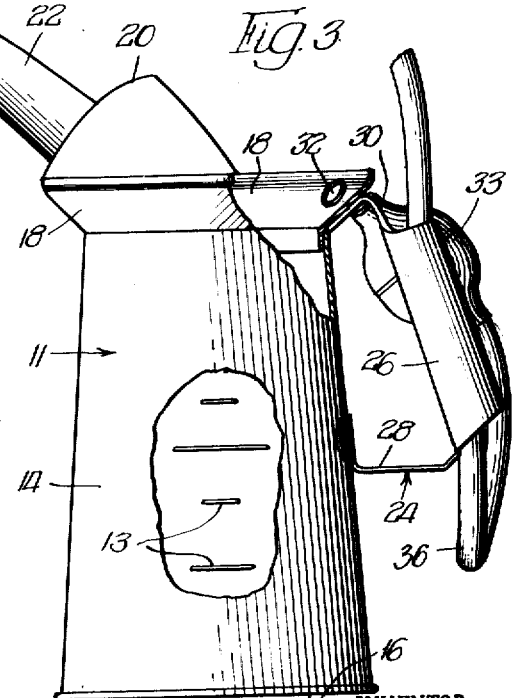
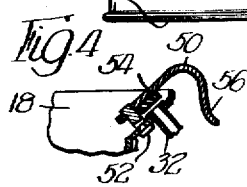
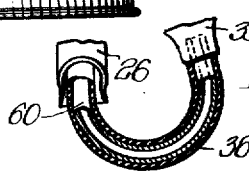
INVENTOR.
Lawrence A. Betz,

United States Patent Office  2,796,880
Patented June 25, 1957

2,796,880

MEASURING SIPHON

Lawrence A. Betz, Chicago, Ill.

Application April 8, 1954, Serial No. 421,928

4 Claims. (Cl. 137—150)

This invention relates to a measuring siphon, and more particularly, to a measuring container provided with means for siphoning liquid.

I have found that it is often desirable to remove liquid from a container through the top thereof under circumstances wherein it is impossible or inconvenient to tilt the container so that the liquid will flow out of a suitable opening provided in the top. For instance, the conventional automobile radiator located at the front end of such vehicles is filled during the winter months with water and varying proportions of a suitable liquid which prevents the water from freezing at low temperatures. Occasionally, it is desirable to change the proportions of water and such a liquid, for instance, alcohol or a suitable antifreeze in a particular radiator, and in the past this has entailed the opening of a port in the lower portion of the radiator to draw off some of the mixture contained in the radiator, and/or adding a supply of water or the desired freeze preventing liquid at the top thereof. The changing of the proportions of water and such liquid contained in radiators has in the past been an operation based mainly on guess work and on the vehicle operator's or garage attendant's experience. The results have been haphazard at best and frequently it is necessary to add or remove varying amounts of the radiator fluids a number of times before the desired fluid characteristics are obtained.

It has occurred to me that a device which allowed one to conveniently remove measured amounts of fluids from the top of receptacles such as an automobile radiator would greatly simplify and expedite the process of modifying proportions of the various liquids present in the container.

It is therefore an object of the present invention to provide a device which comprises a measuring container and means for conveniently removing fluids from the top of a receptacle such as an automobile radiator.

It is a further object of the invention to provide a device comprising a container and a conduit therefor, which conduit includes means for creating a siphon effect in the conduit.

Yet another object of the invention is to provide a combination of a container, a conduit therefor, and a suction bulb interposed in said conduit, wherein the elements of said combination cooperate to provide a convenient and efficient device for aiding in varying the proportions of various liquids held within a receptacle such as an automobile radiator.

Still another object of the invention is to provide a measuring container and siphoning conduit therefor which is peculiarly adapted to use in varying the proportions of water and alcohol or the like in automobile radiators.

In accordance with the present invention, I provide a container, which may be of the measuring type and of any suitable configuration, having an encompassing side wall, a bottom wall secured to the lower edge of the side wall, and an outwardly flaring lip or flange adjacent the top edge of the side wall. A handle comprising a substantially vertically disposed, hollow, hand gripping element is carried by the container, with the upper end of the hand gripping element being disposed adjacent said lip or flange. A port leading to the interior of the container is formed in said lip or flange closely adjacent said upper end of said hand gripping element and a flexible conduit of suitable length is connected to said port. Interposed in said conduit adjacent said port is a suction bulb, which is disposed adjacent to and in substantially coextending relationship with, said hand gripping element. The conduit is arranged so that it extends downwardly from the suction bulb, then upwardly through the hollow gripping element and at the end thereof includes a rigid tubular insertion element for preventing curling of the end of the conduit and for aiding in the insertion of the end of the conduit in the container from which a desired amount of liquid is to be removed. I prefer to provide kink preventing means in or on the portion of the conduit extending from the suction bulb to the lower end of the hollow gripping element to overcome the tendency of this portion of the conduit to kink and block the passageway within the conduit due to the fact that this portion of the conduit is bent back upon itself. One using the device merely inserts the insertion element into the top of the receptacle holding the liquid from which it is desired to withdraw a portion thereof, and places the container at a level below the level of the liquid within the receptacle. He then grasps the hollow gripping element and the suction bulb with one hand, and squeezes the suction bulb against the gripping element; he then blocks the port with a finger or the hand or a suitable blocking element mounted on the lip of the container, and finally releases the suction bulb. The suction bulb thereupon draws sufficient liquid into the conduit to create a siphon effect therein, and the atmospheric pressure acting on the surface of the liquid in the receptacle forces it through the conduit into the measuring container after the port is unblocked. When the desired amount of liquid has been removed from the receptacle, the insertion element may be removed therefrom to break the siphon effect and stop the draining of the liquid into the container of the device.

It will be obvious from the foregoing that the present invention provides substantial advantages over prior practices. For example, the present invention allows, for instance, a gas station or garage attendant to quickly and expeditiously withdraw a desired amount of liquid from an automobile radiator with heretofore impossible accuracy.

In addition to the foregoing, it is an object of the present invention to provide a siphon device which is economical of manufacture, which consists of few and simple parts, and which is highly convenient in use.

Other objects and advantages of the present invention will become apparent in the following description of preferred embodiments of the invention and the preferred use thereof.

Now, in order to acquaint those skilled in the art with the present invention, I shall describe, in connection with the accompanying drawings, preferred embodiments thereof.

In the drawings:

Figure 1 is a side elevational view of a preferred form of the invention, showing the invention as used in connection with the radiator of an automobile;

Figure 2 is a rear elevational view, on a larger scale, of the embodiment of Figure 1, particularly showing the handle and conduit structure forming a part of the invention;

Figure 3 is a view similar to that of Figure 1, but on a large scale and having parts broken away for clarity of illustration;

Figure 4 is a fragmental cross-sectional view through the port formed in the outwardly flaring lip or flange, showing a modification of the present invention; and Figure 5 is a fragmental view of the curved portion of the conduit shown in Figure 2, illustrating a further modification of the invention.

Referring now more particularly to the drawings, wherein like reference numerals indicate like parts throughout the several views, reference numeral 10 of Figure 1 generally indicates a preferred embodiment of the invention, and reference numeral 12 generally indicates a conventional automobile (shown in outline form) in connection with which the invention may be used. The device 10 comprises a container 11 having an encompassing side wall 14, a bottom wall 16 secured thereto in any suitable manner and an outwardly flaring lip or flange 18 suitably secured to (as shown) or integral with the upper edge or end of the side wall. The container, which may assume any suitable configuration, is preferably designed to hold a specified amount of liquid when full, for instance, two quarts, and indicia 13 indicating subdivisions of the whole may be imprinted or formed on the internal surface (as shown) and/or the external surface of side wall 14. The front side of lip or flange 18 has fixed thereto on one side thereof, as by welding, soldering or the like, an arcuate shield 20 having a spout 22 extending therefrom. The container 11 has secured thereto on the rear side thereof a handle 24 comprising a substantially vertical, hollow, hand gripping element 26 having legs 28 and 30 secured to the side wall 14 and the outwardly flaring lip or flange 18, respectively, in any suitable manner, as by welding, soldering, or the like. The lip or flange 18 is perforated adjacent the upper end of the handle 24 and fixed in said perforation is a short tubular member 32 forming a port leading into the interior of the container, which member may take the form of a metal or plastic tube. While the perforation and tubular member 32 are shown on the right hand side of the illustrated embodiment, they may be positioned on the left side thereof with equal beneficial results. A rubber or plastic suction bulb 33 is disposed in generally parallel relation to hand gripping element 26 and the bulb is secured at one end to the depending end of the tubular member 32 and carries at the other end thereof a short rigid rectilinear tube 34 which extends outwardly a short distance from the bulb. The outlet end of a flexible conduit 36 formed of rubber or plastic or the like is fitted over the outwardly extending end of tube 34 and receives therein (as shown) or carries on the outer surface thereof a flexible coil spring 35 made of spring steel or the like. The conduit 36 is passed through the hollow hand gripping element 26 and extends outwardly thereof, the conduit being of sufficient length to extend to a receptacle, such as the radiator 40 of automobile 12, containing the liquids which one desires to remove wholly or partially, or vary the proportions of the various types of liquids making up the whole. The outwardly extending or inlet end of the conduit 36 preferably is provided with a rigid tubular insertion element 38 to prevent curling of the inlet end of the conduit and for aiding in positioning this end of the conduit within the receptacle, for instance, radiator 40.

The device may be used in connection with the removal of liquid from a receptacle, for instance, radiator 40, by inserting the inlet end of the conduit 36 through the top of the container and below the surface of the liquid contained therein. The container 11, either before or after the inlet end is placed in position, is disposed at a level below the surface of the liquid in the receptacle 40, for instance, on the ground in front of the automobile as shown in Figure 1. One then grasps the hollow hand gripping element 26 and the suction bulb 33 with one hand (either hand may be used with equal facility) and presses the suction bulb against the element 26 to collapse the bulb and reduce the volume of air contained therein. One then places a finger over the end of the tubular element 32 forming the container port (the end opening on the inside surface of the lip or flange 18, as shown in Figure 3), to close same and releases the bulb. As the bulb returns to its initial position, a vacuum within same is created and atmospheric pressure acting on the surface of the liquid in radiator 40 forces a quantity of the liquid into the conduit 36. One should thereupon unblock the port so that the liquid will flow into the container. The bulb 33 is of sufficient size and resilient strength to "draw" sufficient liquid upwardly and outwardly of the radiator and then downwardly to carry the liquid in the conduit 36 below the level of the liquid in the radiator 40, and atmospheric pressure acting on the surface of the liquid remaining in the radiator drains the liquid from the radiator until either the level of the liquid in the radiator falls below the downwardly projecting end of element 38 or the inlet end of the conduit is removed from the radiator. The draining of the liquid could also be stopped, of course, by raising the container 11 above the level of the liquid in the radiator 40.

Thus, when one wishes to, for instance, vary the proportions of water and alcohol or antifreeze in an automobile radiator, one may remove an amount of the mixed liquids as measured by the indicia 13 on the side wall 14, or as measured by the capacity of container 11, for instance, two quarts. Having removed a measured amount of the liquid, one then may easily calculate how much water or alcohol or antifreeze must be added to the liquids remaining in the radiator to obtain the desired mixture. The device 10 insures that all liquid removed from the radiator will not be spilled and thus lost for the purposes of estimating the amount of liquid removed, and it also provides a close control over the liquid as it is being removed. For instance, when it is desired to remove an exact amount, one may calibrate the container to include the amount of liquid which would be held in the conduit while the siphoning action is taking place, so that when the level of the liquid in the container 11 reaches a certain elevation therein, one may remove the inlet end of the conduit from the radiator and be sure that the desired amount of liquid has been removed therefrom. Moreover, one may raise the container 11 upwardly and slow down the siphoning action when it is desired to carefully observe when the liquid in the container 11 rises to a particular elevation so that the siphoning action can thereupon be immediately stopped, as by pulling the inlet end of the conduit out of the radiator or raising the container 11 above the level of the liquid in, for instance, radiator 40.

After a sufficient amount of radiator liquid or the like has been drained into container 11, it may be removed by tilting the bottom of the container upwardly so that the liquid flows out spout 22. Arcuate shield 20, however, not only serves as a collector for liquid running into the spout, but it also acts as a deflecting baffle to insure that all the liquid draining through the tube 32 drops into container 11 and not outside thereof.

It should be noted that the particular location and relationship of the hollow, hand gripping element 26, the tubular element 32 forming the port leading into the container, the bulb 33 and the conduit 36 provides a highly efficient arrangement for compressing the bulb and blocking the port whereby the siphon effect is established in the conduit 36. By threading the conduit 36 through the hollow hand gripping element 26, the bulb 33 is urged toward and aligned with the element 26 so that both may be conveniently grasped by the hand of the user, and at the same time, the port is conveniently positioned for blocking by one of the fingers of said hand. Moreover, this portion of conduit 36, being firmly held in place by the hollow element 26, is not subject to entanglement with the container or obstructions against which it may be disposed. This insures that the conduit 36 will not be subject to undue wear and tear and also insures that it and/or the bulb 33 will not be inadvertently disconnected from the container 11.

In Figure 4, I illustrate a modification of the above described embodiment, wherein an arm 50 is pivotally mounted on a stud 52 secured to the lip or flange 18 and carries a stopper pad or cushion 54 which may be formed out of rubber or the like. The arm 50 has an outwardly extending curved handle portion 56 which is adapted to be grasped by one's fingers after the bulb 33 has been collapsed and just before it is released. In this embodiment of the invention, after the inlet end of the conduit has been placed in the container from which it is desired to remove a quantity of liquid, one grasps the hollow hand gripping element and the bulb 33 and presses the bulb against the handle. One then forces the arm 50 against the lip or flange 18 so that the pad or cushion 54 will block the end of tubular member 32, and then releases the bulb. After waiting a few moments to allow atmospheric pressure to force a sufficient quantity of water into the conduit to establish the siphon effect, the arm 50 may then be pivoted to one side so that it will not obstruct the flow of liquid coming out of the tubular member 32. Other means of mechanically blocking the port will occur to those skilled in the art after a perusal of this specification, however, and manifestly, the invention is not limited to the port blocking means shown in Figure 4.

Figure 5 illustrates a further modification of the invention wherein the coil spring 35 and the tube 34 are omitted and substituted therefor is a substantially U-shaped rigid tubular member 60. The member 60 may be inserted in the conduit, as shown in Figure 5, leaving one end thereof extending outwardly of the conduit, and this end is inserted in the bulb 33. As shown, the member 60 is of such a length that it extends from the bulb 33 downwardly, thus defining a smooth curve in the conduit, and then upwardly a short distance into the hollow hand gripping element 26.

The foregoing description and the drawing are given merely to explain and illustrate my invention, and the invention is not to be limited thereto, except in so far as the appended claims are so limited since those skilled in the art who have my disclosure before them will be able to make modifications and variations therein without departing from the scope of the invention.

I claim:

1. A device of the type described comprising a container, conduit means including a flexible portion, extendable from a source of fluid above said container to said container, an outwardly flaring flange carried by said container adjacent the upper end thereof, a handle carried at the side of said container, said handle comprising a substantially vertically disposed, hollow, hand gripping element having the upper end thereof disposed immediately below said flange, a port formed in said flange adjacent said upper end of said gripping element, said port leading into said container, said conduit means being connected to said port and extending downwardly therefrom and thence upwardly through said hollow element, a suction bulb interposed in said conduit means adjacent said port and disposed in generally parallel relation to said hollow element, and said conduit means including a non-kinking portion along the portion thereof extending from the lower end of said bulb to the lower end of said element.

2. The device set forth in claim 1 wherein said non-kinking position is comprised of resilient means.

3. The device set forth in claim 1 wherein said non-kinking portion is comprised of a substantially U-shaped rigid tube.

4. The combination recited in claim 1 including means for closing and opening said port.

References Cited in the file of this patent

UNITED STATES PATENTS

| 1,426,846 | Craig | Aug. 22, 1922 |
| 1,627,734 | Gavaza | May 10, 1927 |
| 2,172,142 | Lebus | Sept. 15, 1939 |
| 2,253,474 | Webber | Aug. 19, 1941 |

UNITED STATES PATENT OFFICE
CERTIFICATE OF CORRECTION

Patent No. 2,796,880                          June 25, 1957

Lawrence A. Betz

It is hereby certified that error appears in the printed specification of the above numbered patent requiring correction and that the said Letters Patent should read as corrected below.

Column 6, line 27, for "position" read -- portion --.

Signed and sealed this 20th day of August 1957.

(SEAL)
Attest:

KARL H. AXLINE                              ROBERT C. WATSON
Attesting Officer                           Commissioner of Patents